(12) United States Patent
Bedingfield, Sr.

(10) Patent No.: US 8,583,644 B2
(45) Date of Patent: *Nov. 12, 2013

(54) METHODS, SYSTEMS, AND COMPUTER PROGRAM PRODUCTS FOR MANAGING AUDIO AND/OR VIDEO INFORMATION VIA A WEB BROADCAST

(75) Inventor: James Carlton Bedingfield, Sr., Lilburn, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,707

(22) Filed: Jun. 8, 2012

(65) Prior Publication Data

US 2012/0245938 A1  Sep. 27, 2012

Related U.S. Application Data

(63) Continuation of application No. 11/411,617, filed on Apr. 26, 2006, now Pat. No. 8,219,553.

(51) Int. Cl.
*G06F 17/30* (2006.01)
*H04N 7/173* (2011.01)

(52) U.S. Cl.
USPC .......................................... 707/736; 725/117

(58) Field of Classification Search
None
See application file for complete search history.

(56) References Cited

U.S. PATENT DOCUMENTS

| | | |
|---|---|---|
| 6,482,011 B1 | 11/2002 | Lee et al. |
| 6,493,872 B1 | 12/2002 | Rangan et al. |
| 6,535,253 B2 | 3/2003 | Barton et al. |
| 6,731,788 B1 | 5/2004 | Agnihotri et al. |
| 6,990,444 B2 | 1/2006 | Hind et al. |
| 7,222,163 B1 | 5/2007 | Girouard et al. |
| 7,292,979 B2 | 11/2007 | Karas et al. |
| 7,421,729 B2 | 9/2008 | Zenoni |
| 7,802,205 B2 | 9/2010 | Bedingfield |
| 2001/0017892 A1 | 8/2001 | Barton et al. |
| 2001/0023436 A1 | 9/2001 | Srinivasan et al. |
| 2001/0047379 A1 | 11/2001 | Jun et al. |
| 2002/0006266 A1 | 1/2002 | Yoon et al. |
| 2002/0091790 A1 | 7/2002 | Cubley |
| 2002/0131511 A1 | 9/2002 | Zenoni |
| 2002/0170071 A1 | 11/2002 | Parnell et al. |
| 2002/0194607 A1 | 12/2002 | Connelly |
| 2003/0106061 A1 | 6/2003 | Gusler et al. |
| 2003/0115612 A1 | 6/2003 | Mao et al. |
| 2003/0200217 A1 | 10/2003 | Ackerman |
| 2004/0009462 A1 | 1/2004 | McElwrath |
| 2004/0073947 A1 | 4/2004 | Gupta |
| 2004/0090424 A1 | 5/2004 | Hurley et al. |
| 2004/0205634 A1* | 10/2004 | Linker et al. .................. 715/526 |
| 2004/0210443 A1 | 10/2004 | Kuhn et al. |
| 2004/0218904 A1 | 11/2004 | Yoon |
| 2004/0220926 A1 | 11/2004 | Lamkin |
| 2005/0120369 A1 | 6/2005 | Matz |
| 2005/0229225 A1 | 10/2005 | Klausberger et al. |
| 2006/0002681 A1 | 1/2006 | Spilo et al. |
| 2006/0080716 A1 | 4/2006 | Nishikawa et al. |
| 2006/0212897 A1 | 9/2006 | Li et al. |

(Continued)

*Primary Examiner* — Tarek Chbouki

(74) *Attorney, Agent, or Firm* — Guntin & Gust, PLC; Jay H. Anderson

(57) ABSTRACT

Provided Web broadcast information is managed by annotation markers. At least one marker is received that annotates the audio and/or video information and the annotated audio and/or video information is saved in an electronically searchable file.

19 Claims, 6 Drawing Sheets

(56) References Cited

U.S. PATENT DOCUMENTS

| | | |
|---|---|---|
| 2007/0008402 A1 | 1/2007 | Ahn et al. |
| 2007/0025693 A1 | 2/2007 | Shibata et al. |
| 2007/0039031 A1 | 2/2007 | Cansler et al. |
| 2007/0044010 A1 | 2/2007 | Sull et al. |
| 2007/0058041 A1 | 3/2007 | Arseneau et al. |
| 2007/0098350 A1 | 5/2007 | Gibbon et al. |
| 2007/0118378 A1 * | 5/2007 | Skuratovsky ............... 704/260 |
| 2007/0124794 A1 | 5/2007 | Marko et al. |
| 2007/0124796 A1 | 5/2007 | Wittkotter |
| 2007/0185840 A1 | 8/2007 | Rhoads |
| 2007/0240058 A1 | 10/2007 | Chen |
| 2007/0256030 A1 | 11/2007 | Bedingfield |
| 2008/0036917 A1 | 2/2008 | Pascarella et al. |
| 2008/0059989 A1 | 3/2008 | O'Connor et al. |
| 2008/0212941 A1 | 9/2008 | Lillethun et al. |
| 2008/0250104 A1 | 10/2008 | Hirayama |
| 2009/0119706 A1 | 5/2009 | Hope et al. |

* cited by examiner

METHODS, SYSTEMS, AND COMPUTER PROGRAM PRODUCTS FOR MANAGING AUDIO AND/OR VIDEO INFORMATION VIA A WEB BROADCAST

CROSS-REFERENCE TO RELATED APPLICATIONS

This application is a continuation of U.S. patent application Ser. No. 11/411,617 filed Apr. 26, 2006, which is incorporated herein by reference in its entirety.

FIELD OF THE INVENTION

The present invention relates generally to information processing and, more particularly, to systems, methods, and computer program products for managing audio and/or video information.

BACKGROUND OF THE INVENTION

As days and years go by, people generate exponentially increasing volumes of personal information. Such information can include documents, e-mail messages, photos, videos, music collections, Web page content, medical records, employment records, educational data, etc. This profusion of information can be organized to some degree and presented; however, it may be of limited use due to a lack of efficient data management systems and methods.

Personal data may be acquired from numerous sources through a variety of means. Moreover, the personal data may be stored in various places using various storage means, such as, for example, on a personal computer, on a cell phone, in computer systems or in paper files at a doctor's, lawyers, and/or accountant's office, etc. The personal data may pertain to a single person or may also pertain to one or more people.

Some organizations offer storage services for information, such as, for example, photos and music. Other organizations provide backup services for all electronic information and/or paper files that a person or organization may have. Nevertheless, there remains a need for improvements in collecting and managing personal information.

SUMMARY OF THE INVENTION

According to some embodiments of the present invention, Web broadcast information is provided and managed by annotation markers. At least one marker is received that annotates the audio and/or video information from the Web broadcast and the annotated audio and/or video information is saved in an electronically searchable file.

In other embodiments, receiving the at least one marker comprises receiving the at least one marker during the Web broadcast.

In still other embodiments, receiving the at least one marker comprises inserting the at least one marker into the audio and/or video information in response to input from a Web broadcast listener.

In still other embodiments, receiving the at least one marker comprises presenting a Web broadcast listener with a user interface for entering the at least one marker and receiving the at least one marker from the Web broadcast listener via the user interface.

In still other embodiments, the at least one marker comprises a graphic, a sound, and/or a keyword.

In still other embodiments, the at least one marker comprises a Universal Resource Locator (URL) address.

In still other embodiments, access to the annotated audio and/or video information is presented in a visual medium that comprises a path with a plurality of partitions.

In still other embodiments, saving the annotated audio and/or video information in the electronically searchable file comprises saving the at least one marker in the electronically searchable file. The electronically searchable file is separate from a file containing the audio and/or video information, but is associated therewith.

In still other embodiments, the at least one marker is substantially undetectable by manual review.

In still other embodiments, the at least one marker is substantially detectable by manual review.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

Figure 1:
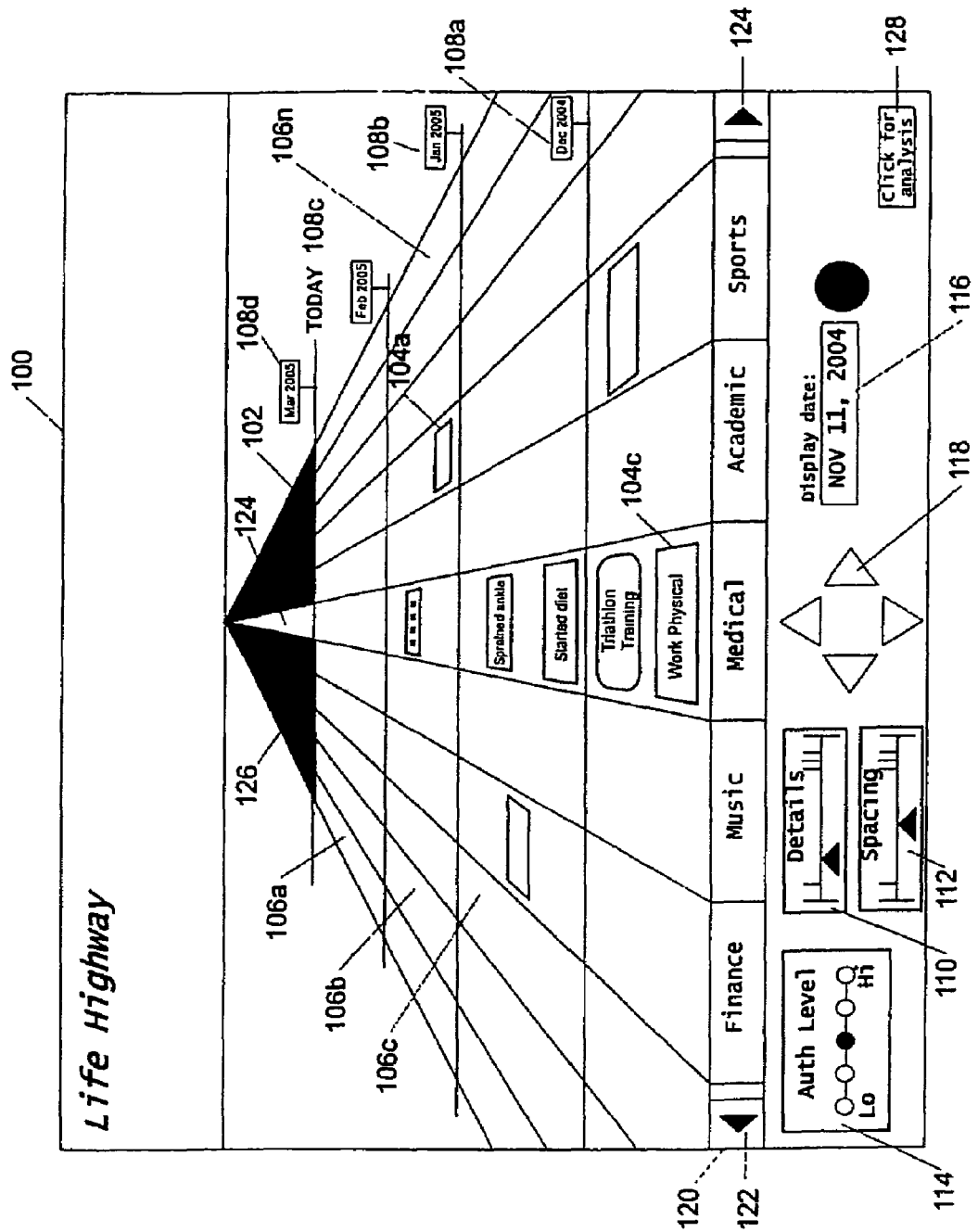
FIG. 1 is a diagram that illustrates a life history in the graphical chronological path presentation of a highway in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

As used herein, the term "file" may include any construct that binds a conglomeration of information, such as instructions, numbers, words, images, audio, and/or video into a coherent unit. Accordingly, a file may be, for example, a document, an image, an email, a database document, an application, an audio recording, a video recording, and/or a Web page.

Embodiments of the present invention are described herein with respect to managing audio and/or video information. For example, an individual may wish to maintain an audio and/or video record of various events in his or her life. According to some embodiments of the present invention, such audio and/or video information may be recorded and then annotated to categorize portions of the audio and/or record and to facilitate subsequent searching of the audio and/or video record. Moreover, U.S. patent application Ser. No. 11/031,777, entitled "Graphical Chronological Path Presentation," describes embodiments in which a chronological record of events and information in the life of a person or entity may be displayed or presented by way of a highway representation. U.S. patent application Ser. No. 11/031,777 (hereinafter '777 application) is hereby incorporated herein by reference in its entirety. In some embodiments, the highway is represented as a path with a plurality of partitions. The annotated audio and/or video information described herein may, for example, be incorporated into one or more of the partitions comprising the path of the '777 application.

FIG. 1 illustrates a display 100, in accordance with some embodiments of the present invention, that includes a graphical interface of a highway 102 where, for example, nearer entries 104c are earlier in time and farther entries 104a are later in time. In other embodiments, this can be reversed or factors other than time can be used, such as importance and/or priority. Multiple lanes can be used to categorize events (a single lane could be used if desired). Lanes may optionally show, for example, a person's age and/or the calendar year as mile markers 108a-d extending across the lanes, with optional displays by month, week, etc.

In some embodiments, the user reviews the events by "flying over" or "driving down" the highway 102. Control can be provided using directional arrows 118 or, in other embodiments, keyboard arrows, keyboard mnemonics, a mouse, a joystick, a trackball, and/or a touchscreen. A user can also enter text data for searches or for navigation to a specific year or age. The user can pick a lane 106a-106n on the highway to drive in. The lane 124 that the viewer ("driver") is in may be signified by a representation of headlights and the driver may see details of the events in that lane; but the driver may also see events in other lanes and can move into other lanes at will. Certain lanes and/or events may be concealed from a given viewer or class of viewers. A class of viewers may correspond to an authorization level.

The category bar 120 holds the label for the category of the events in a lane. If there are more lanes than the settings afford to fit on the screen, the user/viewer can scroll to either side, if available, with arrows 122, 124. The user can set the level of detail for each event with the sliding bar 110. The user can set a maximum detail for an event for an authentication level settable in authentication window 114. A viewer can see the authentication level in the authentication window 114, but cannot change it. A viewer may change the detail level up to the maximum level set by the user and may set the spacing to any desired level in the spacing window 112. The settings in each window 110, 112, and 114 may be performed with sliding bars, radio buttons, or other generally known methods.

The display date window displays the current date when entering the highway. However, the date in the display date window 116 may change to the date of the event that a user/viewer hovers over or selects, configurable by the user/viewer.

Other embodiments may include a feature for developing an indication that some event has been viewed. A trail is kept of the events that are viewed. The indication gets stronger as the event is viewed more often. As time passes, if the event is not viewed, the strength of the indication dissipates. The indication may be used to cache certain events with strong indications for quicker access.

Embodiments of the highway 102 is described in more detail in the '777 application, which has been incorporated by reference as discussed above.

Embodiments of the present invention are described herein with respect providing audio and/or video information via a Web broadcast to allow other users to provide input in annotating the audio and/or video information. As used herein, Web broadcasting refers to a collection of technologies for automatically distributing audio and/or video programs over the Internet via a publish and subscribe model. Web broadcasting is sometimes referred to as "blogcasting," "audioblogging," and/or "videoblogging."

Figure 2:
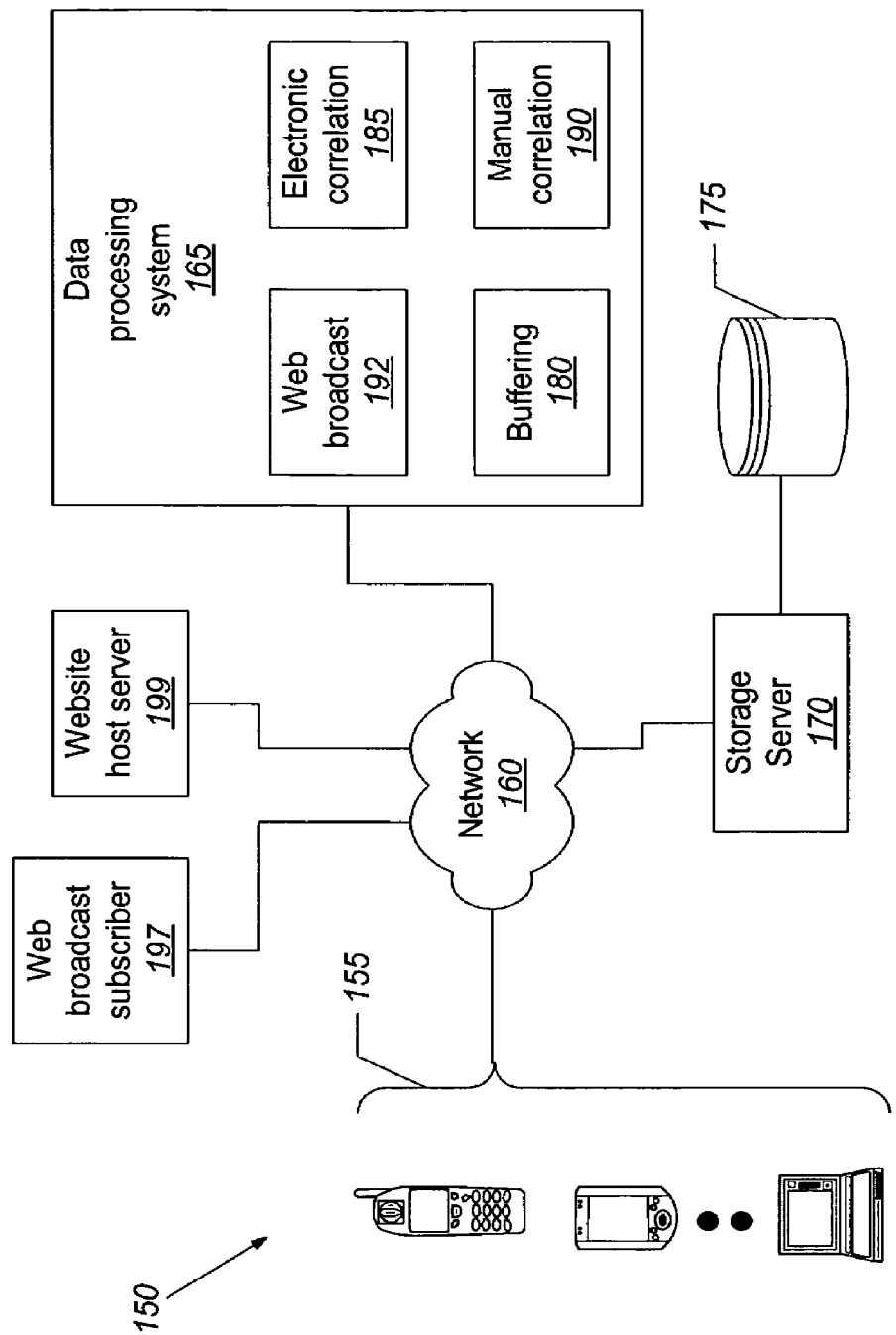
FIG. 2 is a block diagram that illustrates a communication network for managing audio and/or video information in accordance with some embodiments of the present invention.

Referring now to FIG. 2, an exemplary network architecture 150 for managing audio and/or video information, in accordance with some embodiments of the invention, comprises one or more recording devices 155, a network 160, a data processing system 165, and a storage server 170. In accordance with various embodiments of the present invention, the recording device(s) may be a video recorder, an audio recorder, a personal computer with audio and/or video recording equipment and/or software, a camera, a cellular phone equipped with audio and/or video recording functionality, etc. As shown in FIG. 2, the recording device(s) may be connected to a data processing system 165 via the network 160 for further processing of the audio and/or video information recorded by the recording device(s) 155. In other embodiments, the recording device(s) 155 may be directly connected to the data processing system 165 or the recording device(s) 155 and data processing system 165 may comprise part of a single system. The network 160 may be a global network, such as the Internet, public switched telephone network (PSTN), or other publicly accessible network. Various elements of the network may be interconnected by a wide area network, a local area network, an Intranet, and/or other private network, which may not accessible by the general public. Thus, the network 160 may represent a combination of public and private networks or a virtual private network (VPN). The storage server 170 may optionally be used to store the processed audio and/or video information in repository 175 for access by one or more users.

The data processing system 165 may be configured to provide various functionality, in accordance with some embodiments of the present invention, including, but not limited to, a buffering function 180, an electronic correlation function 185, and a manual correlation function 190. The audio and/or video information captured by the recording device(s) 155 may be buffered in the recording device(s) 155 and/or may be buffered in the data processing system 165. The recording of the audio and/or video information may be done in a continuous, "always on" manner such that all information recorded is saved via buffering functionality provided by the recording device(s) 155 and/or the data processing system 165. Once recording for an audio and/or video session is complete, the user may elect to save the audio and/or video information from the buffer to a more permanent storage location or may elect to simply discard the audio and/or video information if the user so desires. If the buffered audio and/or video information is saved, then the user may elect to overwrite old audio and/or video information with the newly recorded information or, in other embodiments, may elect to archive the old audio and/or video information and add the newly recorded information to more permanent storage. When saving the newly recorded audio and/or video information, the user may also elect to add a privacy safeguard to the information to prevent others from reviewing the information if the information is stored in a location that may be accessed by others, for example.

In other embodiments of the present invention, the audio and/or video information may be obtained via other ways than making a recording. For example, a user may receive an audio and/or video file from another person, a user may purchase an audio and/or video file from a seller, a user may download free audio and/or video files off the Internet and/or a user may subscribe or use syndication technology, such as RSS, to obtain a Pod cast, for example, off of the Internet. Thus, the source of the audio and/or video information may come from a variety of sources in accordance with various embodiments of the present invention.

The recorded or obtained audio and/or video information may be processed so as to add markers thereto that may facilitate searching of the information by the user or others. In this regard, the data processing system 165 may include an electronic correlation function 185 that may be used to electronically process an audio and/or video file and insert markers therein that are correlated with passages or segments of the file. In the case of an audio file, the electronic correlation function 185 may provide an audio-to-text conversion function that generates a text file based on the recorded audio file. The text file may then be processed to generate a concordance of words therein. The words that are deemed relevant may then be correlated with passages in the text file to allow a user to search for keywords and then call up passages of the text that are correlated with those keywords. In some embodiments, text-to-audio processing may be performed to convert the text back into audio allowing the user to listen to the passage(s) retrieved by the keyword search. In the case of a video file, the electronic correlation function 185 may detect logical divisions in the video information and insert markers in the video file identifying these transition points.

Instead of or in addition to an electronic correlation function 185, the data processing system 190 may include a manual correlation function 190 that may provide a user with an interactive technique for annotating an audio and/or video file with markers. One approach for manual correlation is for the user to simply record markers in the audio and/or video information in real time at the time the information is being recorded or for the recording device(s) to automatically insert time-stamps in the recording at periodic intervals. A user may wish, however, to annotate the audio and/or video information after the information has already been recorded or obtained. Accordingly, the manual correlation function 190 may provide a user interface for a user to review an audio and/or video file and to insert keywords, sounds, images, or other type of marker to facilitate searching of the audio and/or video file.

In some embodiments, the electronic correlation function 185 and the manual correlation function 190 may be used to generate a single annotated audio and/or video file. In these embodiments, the single file contains both audio and/or video content along with the markers inserted to annotate the file to facilitate searching. In other embodiments, the electronic correlation function and the manual correlation function 190 may be used to generate a separate annotation file that is associated with the audio and/or video file. In these embodiments, the audio and/or video file remains unchanged and the annotation file contains the markers that may be implemented using records. Each record may include an annotation and an associated location in the original audio and/or video file. For example, one annotation could be "dinner conversation with Ben about regatta results," and the location could be in the form HH:MM:SS (relative time from start) or YYYY/MM/DD HH:MM:SS (absolute date and time) for an audio file. Similar date/time location and/or a frame counter could be used for a video file. The separate annotation file may be especially useful, for example, when the audio and/or video file is stored on a read-only medium (e.g., CD or DVD) and/or when it is undesirable to alter the original file.

A user may wish, however, to enlist the help of others in annotating an audio and/or video file. For example, the audio and/or video file may be lengthy and getting input annotation input from numerous sources may allow the file to be annotated much more quickly than if a single person annotated the entire file. In addition, a user may wish to obtain annotated input from a variety of people so as to obtain their perspective on the audio and/or video file content. In accordance with some embodiments of the present invention, a Web broadcast function 192 may be provided to allow a user to broadcast the audio and/or video file to multiple individuals. As shown in FIG. 2, one or more Web broadcast subscribers 197 may listen to or view the Web broadcast of the audio and/or video information and may annotate the audio and/or video information via a user interface as described above. That is, the Web broadcast subscriber 197 may review the audio and/or video file and insert keywords, sounds, images, or other type of marker to facilitate searching of the audio and/or video file. To facilitate broadcasting of the Web broadcast on the Internet, a Website host server 199 may be provided. It will be understood that the functionality of the Website host server 199 and the data processing system 165 may be provided as a single system or as multiple systems in accordance with various embodiments of the present invention.

The buffering function 180, electronic correlation function 185, manual correlation function 190, and Web broadcast function 192 will be discussed in greater detail below. Although FIG. 2 illustrates an exemplary communication network, it will be understood that the present invention is not limited to such configurations, but is intended to encompass any configuration capable of carrying out the operations described herein.

Figure 3:
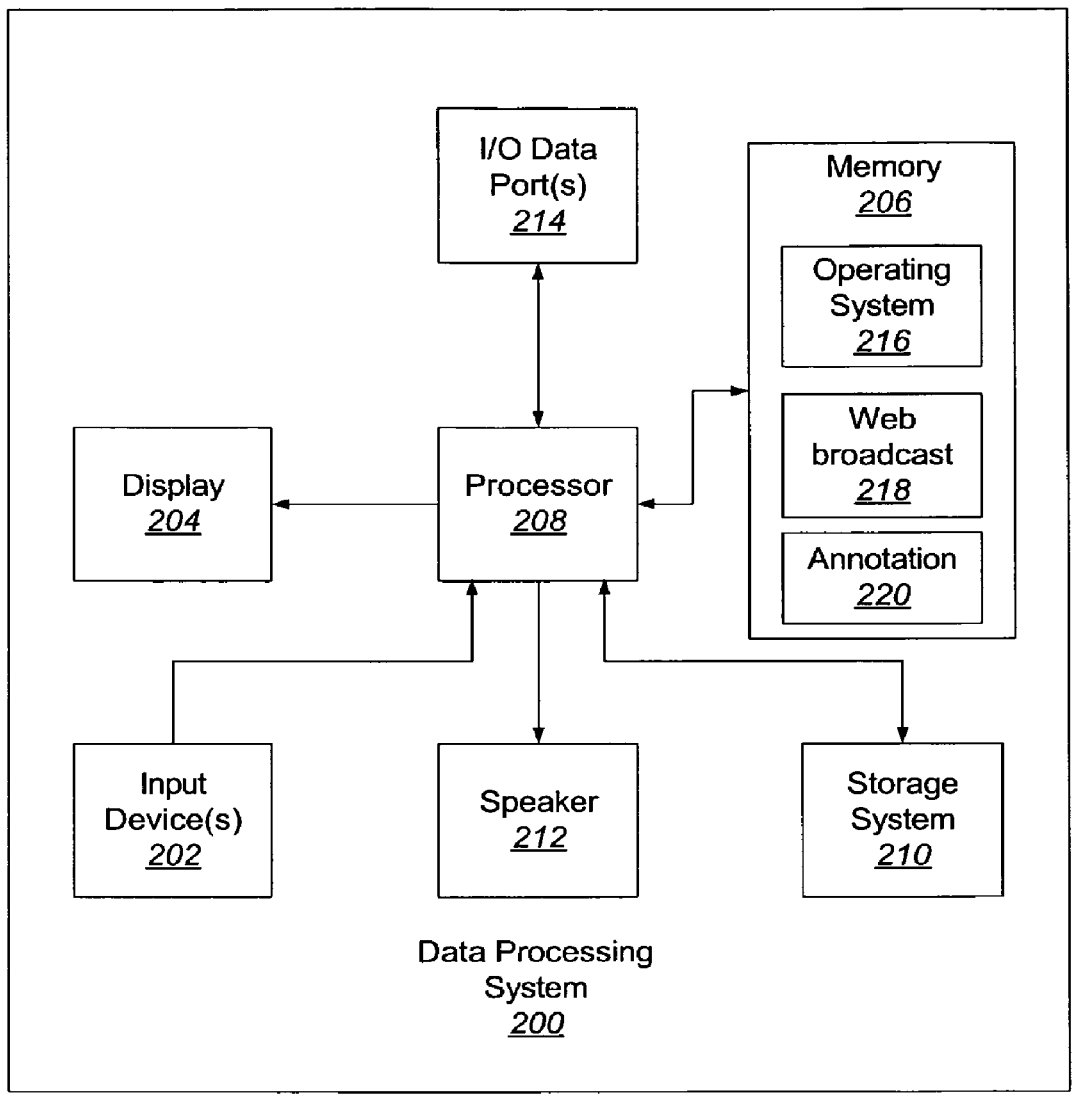
FIG. 3 illustrates a data processing system that may be used to implement a Website host server of the communication network of FIG. 2 in accordance with some embodiments of the present invention.

Referring now to FIG. 3, a data processing system 200 that may be used to implement the Website host server 199 of FIG. 2, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The 110 data port(s) 214 may be used to transfer information between the data processing system 200 and another computer system or a network (e.g., the Internet). These components may be conventional components such as those used in many conventional computing devices, which may be configured to operate as described herein.

The processor 208 communicates with the memory 206 via an address/data bus. The processor 208 may be, for example, a commercially available or custom microprocessor. The memory 206 is representative of the one or more memory devices containing the software and data used for managing audio and/or video information Web broadcasts in accordance with some embodiments of the present invention. The memory 206 may include, but is not limited to, the following types of devices: cache, ROM, PROM, EPROM, EEPROM, flash, SRAM, and DRAM.

As shown in FIG. 2, the memory 206 may contain up to three or more categories of software and/or data: an operating system 216, a Web broadcasting module 218, and an annotation module 220. The operating system 216 generally controls the operation of the data processing system 200. In particular, the operating system 216 may manage the data processing system's software and/or hardware resources and may coordinate execution of programs by the processor 208. The Web broadcasting module 218 may be configured to manage the Web broadcast of the audio and/or video information, including setting up the feed and managing subscriptions from various users of the Web. The annotation module 220 may be configured to process an audio and/or video information Web broadcast by annotating the audio and/or video information with one or more markers. Such markers may allow a user to categorize or highlight various portions of an audio and/or video file. Advantageously, this may allow a user to search more quickly for desired segments of an audio and/or video file using the one or more markers as search term(s).

Although FIG. 3 illustrates exemplary hardware/software architectures that may be used in data processing systems, such as the Website host server 199 and data processing system 165 of FIG. 2 and the data processing system 200 of FIG. 3, for managing audio and/or video information, it will be understood that the present invention is not limited to such a configuration but is intended to encompass any configuration capable of carrying out operations described herein. Moreover, the functionality of the Website host server 199 and data processing system 165 of FIG. 2 and the data processing system 200 of FIG. 3 may be implemented as a single processor system, a multi-processor system, or even a network of stand-alone computer systems, in accordance with various embodiments of the present invention.

Computer program code for carrying out operations of data processing systems discussed above with respect to FIGS. 2 and 3 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary operations for managing audio and/or video information will now be described with reference to FIGS. 4 and 2. Operations begin at block 300 where the recording device(s) 155 records audio and/or video information and/or a user obtains the audio and/or video information via other means. In accordance with various embodiments of the present invention, the recording device may be always on to record a continuous stream of audio and/or video events or may be turned on and off intermittently based on user input to only record those audio and/or video events that are of interest to the user. The audio and/or video information may be buffered either in the recording device(s) 155 and/or the buffering function 180 of a data processing system. The buffered audio and/or video information may be transferred to the data processing system 165, 200 where the buffered audio and/or video information may be saved or discarded based on input received from a user. The new buffered audio and/or video information may overwrite old information that has been saved or the old audio and/or video information may be archived and the newly buffered information saved without overwriting any old audio and/or video information. In some embodiments, the newly buffered information may be saved with privacy protection at block. This may be useful if the audio and/or video information is stored in a public storage location or in a location that others may have access or gain access to.

At block 305, the audio and/or video information is annotated with one or more markers. As discussed above, the marker(s) may serve to categorize and/or highlight segments of the audio and/or video information, which may facilitate searching of the audio and/or video information by one or more users. In some embodiments of the present invention, the audio and/or video information may be annotated while the audio and/or video information is being recorded. For example, a user may record sounds, such as keywords or other demarcation sounds, and/or images while the audio and/or video information is being recorded.

In other embodiments, the audio and/or video information may be annotated after it has been recorded. For example, referring now to FIG. 5, operations begin at block 400 where the Website host server 199 provides audio and/or video information via a Web broadcast to subscribers, e.g., subscriber 197 of FIG. 2, on the Web. In accordance with various embodiments of the present invention, the Web broadcast may be open to the general public or to select individuals, e.g., family members or friends, whom the owner of the Web broadcast has decided to grant access to.

At block 405, the Website host server 199 receives at least one marker that annotates the audio and/or video that is the subject of the Web broadcast. In accordance with various embodiments of the present invention, a Web broadcast participant listening/viewing the Web broadcast may input one or more markers during the Web broadcast to annotate the audio and/or video information. As discussed above, the marker(s) may serve to categorize and/or highlight segments of the audio and/or video information, which may facilitate searching of the audio and/or video information by one or more users. In some embodiments of the present invention, the audio and/or video information may be annotated while the audio and/or video information is being Web broadcast. For example, a user may submit sounds, such as keywords or other demarcation sounds, and/or images or graphics while the audio and/or video information is being Web broadcast.

Figure 6:
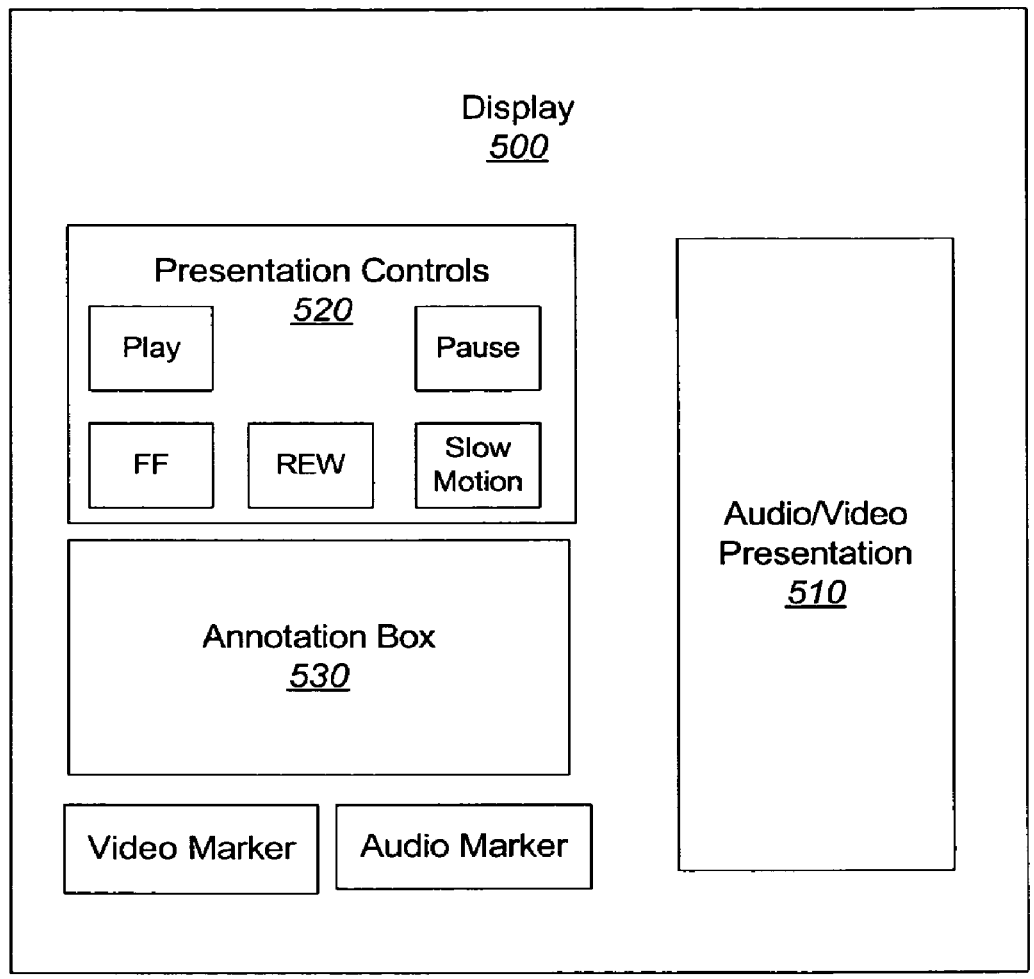
FIG. 6 is a user interface for managing audio and/or video information in accordance with some embodiments of the present invention.

To facilitate annotation of Web broadcast audio and/or video information via a Web broadcast subscriber, the annotation module 220 may provide a user interface as shown in FIG. 6 via the Website host server 199 in which a display 500 includes a window 510 in which the audio and/or video information may be presented to a user. For example, the video information, the text information that has been generated from recorded audio information, or the recorded audio information may be presented in the window 510. A user may manipulate the presentation controls 520 to pause, speed up, slow down, etc. the presentation to allow the user to enter custom markers in the annotation box 530, which are then added to the video, text, and/or audio information. The custom markers may include, but are not limited to, typed text, uploaded images, sounds input through a microphone, and the like. Icons may also be provided, for example, to allow the user to input standard video markers and/or audio markers into the video and/or audio file. This may be useful when a user simply wants to partition an audio and/or video file into segments without the need to distinguish between markers or to add additional information by way of the marker.

In accordance with various embodiments of the present invention, the markers used to annotate the audio and/or video file may be constructed to be of value during a human search and/or during a mechanical search (i.e., automated search). For example, one type of marker that may be used for a video file is a visible icon or image that appears on multiple video frames and is visible during a fast-forward operation. Similarly, for an audio file, an audio marker may be used that is audible and understandable when the audio file is played in a fast-forward manner. To facilitate a mechanical/automated search, embedded markers may be used that are virtually undetectable during a manual review. For example, a marker may be a short burst of high-frequency audio that encodes the annotation and/or a digital annotation embedded in the first few pixels of the first line of a video image. It will be understood that audio and/or video files may include markers of both types that are of value during both human searching and mechanical searching for increased flexibility in accordance with various embodiments of the present invention.

Returning to FIG. 4, the annotated audio and/or video information Web broadcast is saved as an electronically searchable file at block 310. The file may advantageously be searched based on the one or more markers contained therein, such as image, graphic, sound, text, date, and/or time stamp markers. Moreover, a Web user listening to or viewing the Web broadcast may wish to annotate the Web broadcast with a Universal Resource Locator (URL) to provide a link to other sites on the Web. Thus, a user may obtain audio and/or video information, which may then be provided to other users on the Web to assist the user in annotating the audio and/or video information. Such audio and/or video information may, for example, be used to record various events for an entity, a person, the person's family, or others. In some embodiments, a user may also wish to assign the annotated audio and/or video file to one or more of the partitions comprising the highway 102 of FIG. 1. The highway 102 may thus serve as a metaphor for the user's life allowing relatively rapid access of information that may be categorized, for example, by subject matter and/or time as illustrated in FIG. 1. Moreover, the annotation functionality provided by some embodiments of the present invention may allow a user to more readily search audio and/or video information that has been recorded and saved as part of the highway 102.

Figure 4:
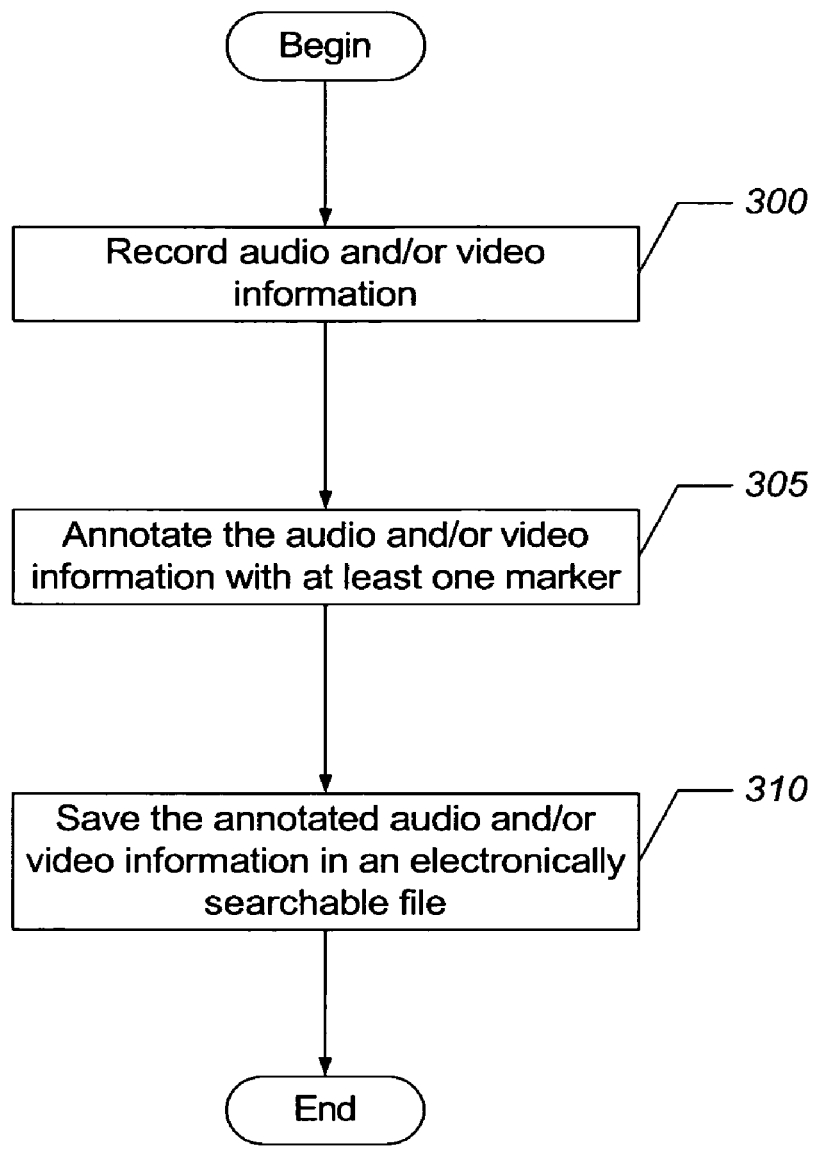
FIGS. 4 and 5 are flowcharts that illustrate operations of managing audio and/or video information in accordance with some embodiments of the present invention.
Figure 5:
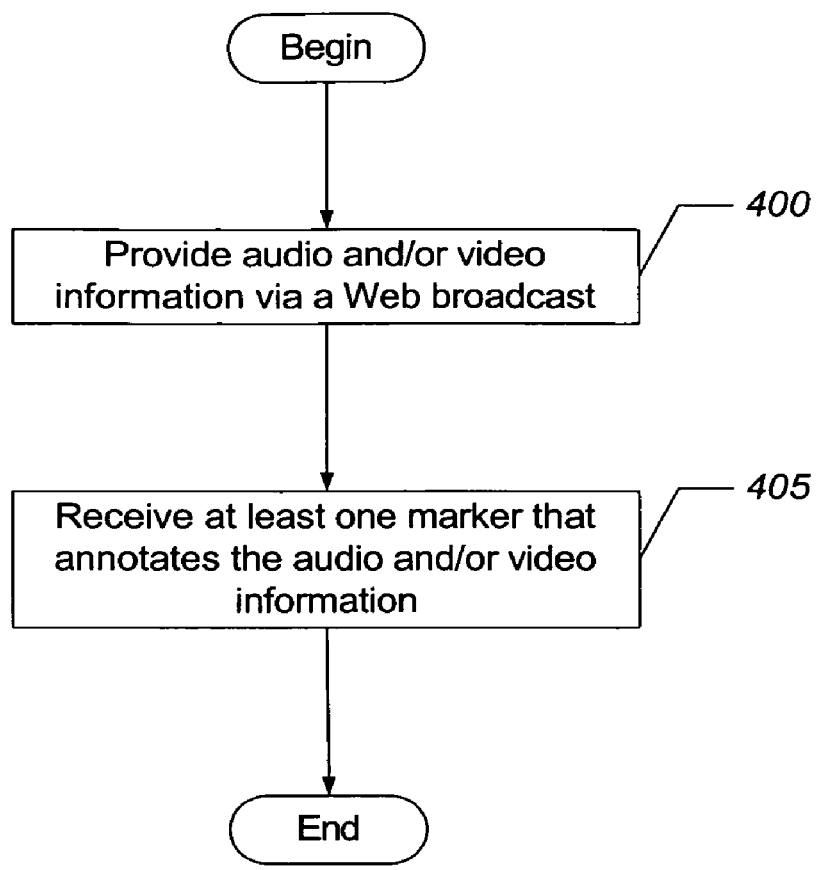

The flowchart of FIGS. 4 and 5 illustrate the architecture, functionality, and operations of some embodiments of methods, systems, and computer program products for managing audio and/or video information. In this regard, each block represents a module, segment, or portion of code, which comprises one or more executable instructions for implementing the specified logical function(s). It should also be noted that in other implementations, the function(s) noted in the blocks may occur out of the order noted in FIGS. 4 and 5. For example, two blocks shown in succession may, in fact, be executed substantially concurrently or the blocks may sometimes be executed in the reverse order, depending on the functionality desired.

Many variations and modifications can be made to the embodiments described herein without substantially departing from the principles of the present invention. All such variations and modifications are intended to be included herein within the scope of the present invention, as set forth in the following claims.

That which is claimed:

1. A method, comprising:
providing, by a system comprising a processor, media information via a web broadcast;
converting, by the system, audio content in the media information to textual content;
generating, by the system, a group of words from the textual content that are correlated to one or more passages in the textual content to enable a search of words from the group of words to cause a retrieval of the one or more passages in the textual content;
presenting, by the system, equipment of a web broadcast listener with a user interface for entering a plurality of markers;
receiving, by the system, the plurality of markers during the web broadcast that annotates the audio content in the media information based on one or more words searched from the group of words, wherein the plurality of markers are correlated to a corresponding plurality of segments of the media information, wherein the plurality of markers are descriptive of content in the corresponding plurality of segments, wherein the plurality of markers are stored in an annotation file, wherein the plurality of markers comprises one of a graphic, a sound, or a keyword, and wherein each marker of the plurality of markers has an identifier to locate the segment correlated with the marker; and
searching, by the system, the media information according to the plurality of markers in an annotation file.

2. The method of claim 1, wherein the receiving of the plurality of markers comprises receiving, by the system, the plurality of markers from the equipment of the web broadcast listener.

3. The method of claim 2, wherein the plurality of markers are received via the user interface.

4. The method of claim 1, wherein each of the plurality of markers further comprises a universal resource locator address.

5. The method of claim 1, comprising presenting, by the system, access to the media information in a visual medium that comprises a path with a plurality of partitions.

6. The method of claim 1, wherein the annotation file is separate from a file containing the media information.

7. The method of claim 1, wherein the plurality of markers are substantially undetectable by manual review.

8. The method of claim 1, wherein the plurality of markers are substantially detectable by manual review.

9. A system, comprising:
a memory to store computer executable code; and
a processor coupled to the memory, wherein executing the computer executable code, causes the processor to perform operations comprising:
presenting media information via a web broadcast;
converting audio content in the media information to textual content;
generate a group of words from the textual content that are correlated to one or more passages in the textual content to enable a search of words from the group of words to cause a retrieval of the one or more passages in the textual content;
detecting logical divisions in video content in the media information;
presenting equipment of a web broadcast listener with a user interface for entering a plurality of markers;
receiving the plurality of markers that annotates the media information during the web broadcast based on one or more words searched from the group of words, wherein the plurality of markers are correlated with at least one of the logical divisions in the video content of the media information, wherein the plurality of markers are descriptive of content in the at least one logical division in the video content, wherein the plurality of markers are stored in an annotation file, wherein the plurality of markers comprises one of a graphic, a sound, or a keyword, and wherein each of the plurality of markers has information to locate at least one logical division correlated with the marker; and
searching the media information according to the plurality of markers of an annotation file.

10. The system of claim 9, wherein execution of the computer executable code causes the processor to perform operations comprising receiving the plurality of markers from the equipment of the web broadcast listener.

11. The system of claim 10, wherein the plurality of markers are received via the user interface.

12. The system of claim 9, wherein one of the plurality of markers comprises a universal resource locator address.

13. The system of claim 9, wherein execution of the computer executable code causes the processor to perform operations comprising presenting access to the media information in a visual medium that comprises a path with a plurality of partitions.

14. The system of claim 9, wherein the annotation file is separate from a file containing the media information.

15. The system of claim 9, wherein the plurality of markers are substantially undetectable by manual review.

16. The system of claim 9, wherein the plurality of markers are substantially detectable by manual review.

17. A non-transitory computer readable storage medium, comprising computer instructions, which when execute by a processor, causes the processor to perform operations comprising:
converting audio content in media information to textual content;
generating a group of words from the textual content that are correlated to one or more passages in the textual content to enable a search of words from the group of words to cause a retrieval of the one or more passages in the textual content;
providing media information via a web broadcast;
presenting equipment of a web broadcast listener with a user interface for entering a plurality of markers;
receiving at least one marker of the plurality of markers during the web broadcast that annotates the media information based on one or more words searched from the group of words, wherein the at least one marker is correlated with at least one segment of the media information, wherein the plurality of markers are descriptive of content in the at least one segment, wherein the plurality of markers are stored in an annotation file, wherein the plurality of markers comprises one of a graphic, a sound, or a keyword, and wherein each marker of the at least one marker has information to locate the segment correlated with the marker; and searching the at least one segment of the media information according to the at least one marker.

18. The non-transitory computer readable storage medium of claim 17, wherein the annotation file is separate from a file containing the media information.

19. The non-transitory computer readable storage medium of claim 17, wherein the plurality of markers are substantially undetectable by manual review.

* * * * *